Aug. 31, 1965  W. STELZER  3,203,516
ANTI-SKID BRAKE CONTROL
Filed Oct. 15, 1962  2 Sheets-Sheet 1
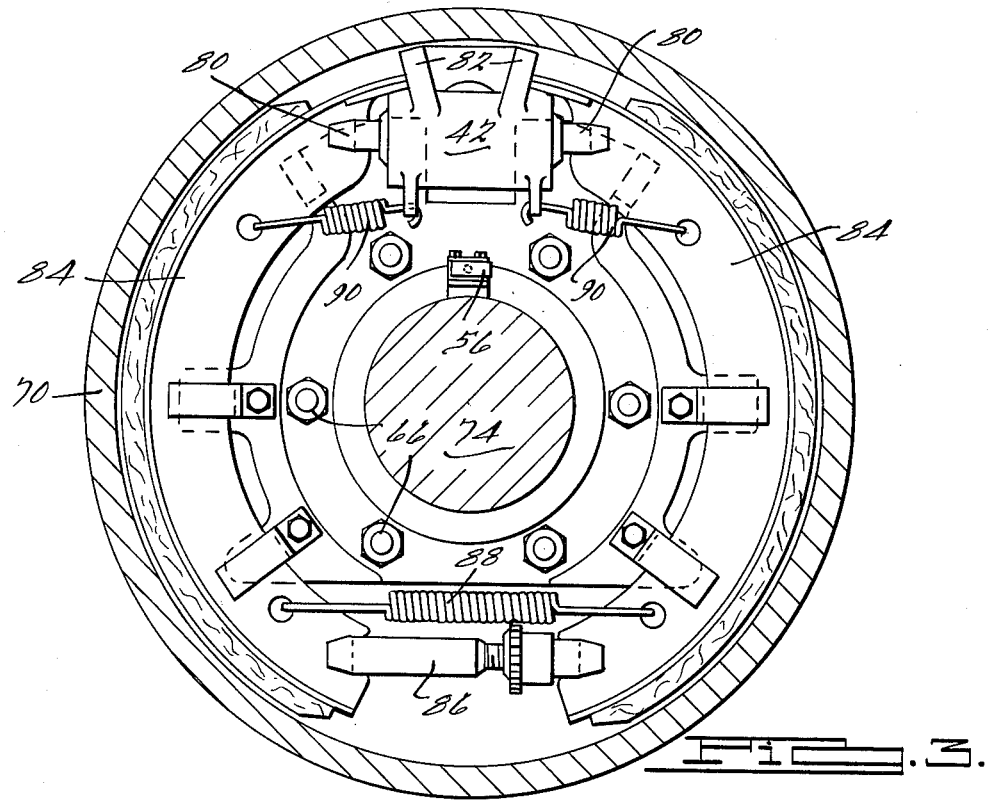
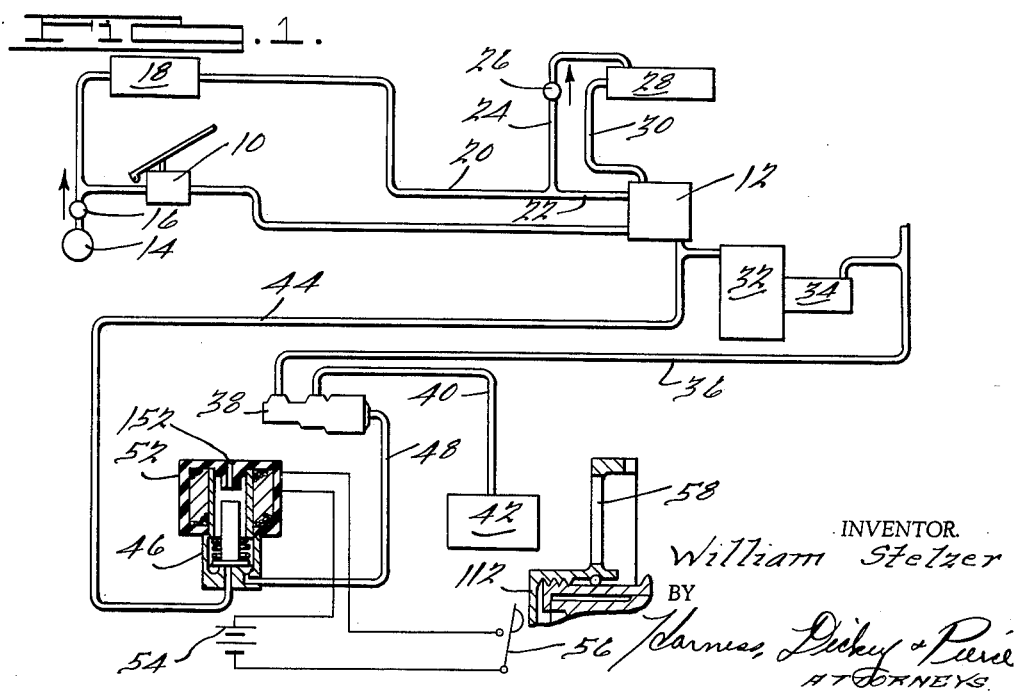
INVENTOR.
William Stelzer
BY
Harness, Dickey & Pierce
ATTORNEYS Aug. 31, 1965   W. STELZER   3,203,516
ANTI-SKID BRAKE CONTROL
Filed Oct. 15, 1962   2 Sheets-Sheet 2
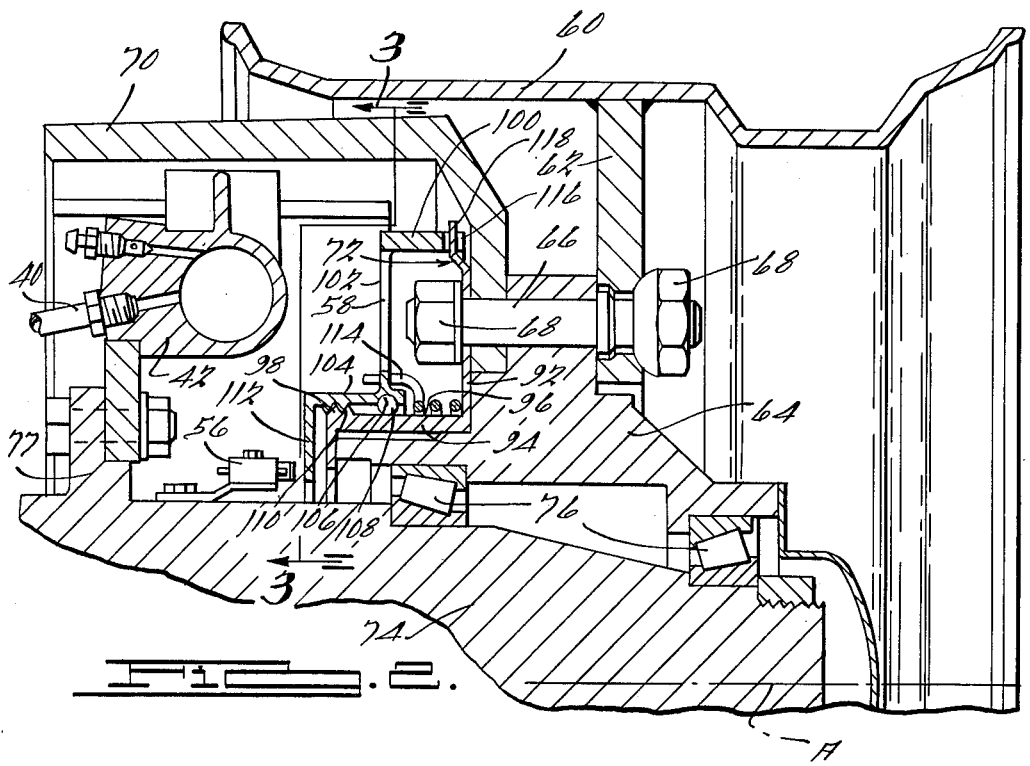
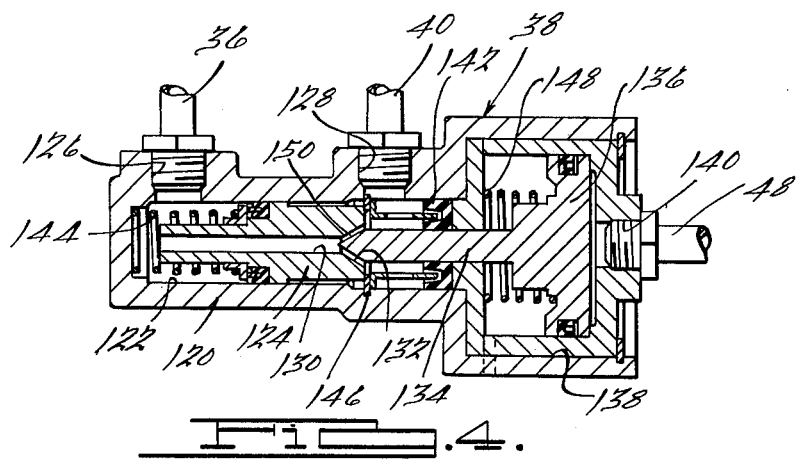
INVENTOR.
William Stelzer
BY
Harness, Dickey & Pierce
ATTORNEYS United States Patent Office 3,203,516
Patented Aug. 31, 1965

3,203,516
ANTI-SKID BRAKE CONTROL
William Stelzer, Bloomfield Hills, Mich., assignor to Kelsey-Hayes Company, Romulus, Mich., a corporation of Delaware
Filed Oct. 15, 1962, Ser. No. 230,507
6 Claims. (Cl. 188—181)

This invention relates to a vehicle anti-skid brake control and more particularly to apparatus for reducing the brake pressure applied to a fluid brake upon the occurrence of conditions indicative of skidding.

It is an object of the present invention to provide an apparatus of the above character utilizing an inertia member for detecting a predetermined rate of wheel deceleration in which the inertia member may be of a relatively light weight and highly responsive to deceleration.

It is another object of the present invention to provide a device of the above character having a deceleration responsive member which is operable to actuate a switch upon the occurrence of a given rate of wheel deceleration, which effects operation of power operated means for opposing the applied brake force.

It is another object of the present invention to provide apparatus of the above character in which the reduction in brake pressure is roughly proportionate to the rate of wheel deceleration and the reduction in fluid pressure delivered to the brakes is increased as the operator-applied brake pressure is increased.

It is a further object of the present invention to provide apparatus of the above character which is relatively inexpensive to fabricate, which is reliable and efficient in operation and which is ruggedly constructed.

These and other objects of the present invention will become apparent from the following detailed description taken in conjunction with the accompanying drawings wherein:

FIGURE 1 is a schematic view of a brake system incorporating the apparatus of the present invention;

FIG. 2 is a fragmentary cross-sectional view through structure forming a part of the mechanism of FIG. 1;

FIG. 3 is a reduced sectional view of the structure illustrated in FIG. 2, taken along the line 3—3 thereof; and FIG. 4 is a vertical sectional view through structure forming another part of the mechanism of FIG. 1.

The present invention has application to any wheeled vehicle having a brake for braking one or more of the wheels. However, the invention is illustrated herein as applied to a trailer braking system. The system as a whole is shown in FIG. 1 wherein a treadle mechanism 10 is operable to control the discharge of compressed air through a standard relay valve 12, which is a well known, commercially available part. The treadle 10 is, of course, positioned on the floor of the truck cab pulling the trailer for operation by the foot of the truck driver, while the relay valve 12 is mounted on the trailer being pulled. Compressed air for delivery to the relay valve 12 is produced by a compressor 14 and delivered through a check valve 16 to a pressure supply tank 18. Compressed air travels from the pressure supply tank 18 through a conduit 20 from which it is free to flow either directly into the relay valve 12 through a conduit 22 or through a conduit 24 and a check valve 26 into a second compressed air tank 28. The tank 28, which is mounted on the trailer, is capable of delivering compressed air through a conduit 30 to the relay valve 12 and provides a second source of compressed air for actuating the trailer brakes, should the supply conduit 20 become parted. Compressed air is discharged from the relay valve 12 in amounts controlled by the operation of the treadle 10 for delivery to a power booster unit 32 which operates a standard master cylinder 34. The master cylinder 34 contains hydraulic fluid for delivery through a conduit 36 to a regulating mechanism 38. From the regulating mechanism 38, fluid flows through a conduit 40 to a brake cylinder 42. Although only one regulating mechanism 38 and one brake cylinder 42 are illustrated, they may be provided in numbers corresponding to each of the brakes of the trailer, if so desired.

It will be seen that compressed air is discharged from the relay valve 12 not only through the power booster unit 32 but also through a conduit 44 to a solenoid controlled valve 46. The valve 46 is illustrated in its normally closed position but, when open, compressed air flows through the valve 46 to a conduit 48 and into the regulating mechanism 38 in a manner which will be subsequently described. The valve 46 is controlled by operation of a solenoid 52. Electric current to energize solenoid 52 is provided by a battery 54 and an energizing circuit for the solenoid 52 is completed by the closure of the contacts of a switch 56. The switch 56 is operated by an inertia member or fly wheel 58, which is associated with the wheel to be braked by the brake cylinder 42 as illustrated in FIG. 2. The details of the inertia member 58 and its manner of support and operation are shown in FIG. 2, whereas the regulating mechanism 38 and its manner of construction is illustrated in FIG. 4.

Referring now to FIG. 2, a wheel or wheel rim 60 is shown as having a spider portion 62 which is connected to a hub 64 by a plurality of bolts 66 and nuts 68. Also secured to the hub 64 by the bolts 66 and nuts 68 are a brake drum 70 and an annular guide or support member 72 which surrounds the hub 64. The support member 72 serves to support and guide the movement of the inertia member 58. The hub 64 is supported for rotation about an axis A on a non-rotating axle 74 by means of anti-friction bearings 76. The axle 74 includes an annular rib 77 to which is fastened the brake cylinder 42 containing a pair of pistons (not shown), the piston rods of which are indicated at 80 in FIG. 3.

As indicated in FIG. 3, the brake cylinder 42 is provided with a pair of upstanding ears or abutments 82 which serve to anchor the adjacent ends of a pair of brake shoes 84. As may be seen, the brake shoes 84 are connected by an adjustable strut 86 and a spring 88. A return spring 90 also interconnects the ends of the brake shoes 84 adjacent the cylinder 42 with the cylinder for the purpose of retracting the shoes 84 away from the drum 70 upon the release of the brake pressure.

Considering now the details of construction of the support member 72, this member will be seen to include a flat annular portion 92 held against the hub 64 and the brake drum 70. The support 72 also includes a sleeve portion 94 connected to the radially inner edge of the portion 92 and provided with a smooth circular cylindrical surface 96, the outer diameter of which terminates at its axially inner end in a helical thread 98. The inertia member 58 includes a radially outer portion 100 connected through a plurality of spokes 102 to a sleeve portion 104 having an annular groove 106 on its inner diameter. A plurality of balls 108 is confined in the groove 106 and rides on the cylindrical surface 96 of the support member 72. The inertia member 58 is provided with a thread 110 which interengages the thread 98 of the support member 72 and with an annular shoulder portion 112 which is disposed in a plane transverse to the axis of rotation and extends radially inwardly from the sleeve portion 104. The shoulder portion 112 is in axially confronting relation to the switch 56 to actuate the switch 56 upon movement of the inertia member 58 in an axially inward direction. A helical torsion spring 114 is coiled around the sleeve portion 94 of the support member 72 and engages one of the inertia member spokes 102 at its one end. The opposite end of the spring 114 is fixed to the support member 72 so that the spring 114 applies a torque to the inertia member 58, maintaining a shoulder 116 thereof in engagement with a radially outwardly projecting tab or a button 118 formed on the support member 72. Upon the application of braking force to the wheel when the vehicle is going in a forward direction, the momentum of the inertia member or fly wheel 58 opposes the load applied thereto by the spring 114. Upon the attainment of a rate of deceleration of a predetermined amount, this momentum or inertia becomes sufficient to produce rotation of the inertia member 58 relative to the support member 72. The particular rate at which this will occur is dependent largely upon the strength of the spring 114 and the weight of the inertia member 58. Under such circumstances, the interengaging threads 98 and 110 will guide the inertia member 58 in an axially inward direction to cause the shoulder portion 112 of the inertia member 58 to actuate the switch 56. It will be seen that the balls 108 will roll over the surface 96 of the support member 72 so that frictional forces tending to resist rotation of the inertia member 58 are minimized and the inertia member 58 is highly responsive to deceleration. The spring 114 is selected for the particular inertia member 58 being used so that it will exert a force which will prevent angular movement of the inertia member 58 relative to the support 72 under conditions when skidding of the wheel normally will not occur yet which will yield to permit the inertia member 58 to actuate the switch 56 when the deceleration becomes great enough to normally produce skidding or incipient skidding.

Referring again to FIGURE 1, it will be seen that the actuation of switch 56 by contact of the shoulder portion 112 of the inertia member 58 therewith will energize the solenoid 52 to open the valve 46 and permit the flow of compressed air from the relay valve 12 into the regulating mechanism 38.

Turning now to the details of the regulating mechanism 38 as illustrated in FIG. 4, it will be seen that the regulating mechanism 38 includes a housing 120 provided with a bore 122 in which a piston 124 is reciprocable. The housing 120 also has an inlet 126 at one end of the bore 122 connected to the inlet conduit 36 and an outlet 128 at the other end of the bore 122 connected to the conduit 40. The piston 124 is between the inlet 126 and the outlet 128 and is provided with a bypass opening 130 extending completely therethrough and a conical valve seat 132 surrounding the opening 130 at the end thereof adjacent the outlet 128. The valve seat 132 is adapted to be closed by a valve element 134 projecting from one side of a piston 136 which is reciprocable in a bore 138 formed in the housing 120 coaxially with the bore 122. The housing 120 has an opening 140 connected to the conduit 48 providing fluid communication from the conduit 48 to the bore 138 on the side of the piston 136 opposite from valve element 134. The valve element 134 is engaged on its surface by a double lip seal member 142 which prevents the leakage of air and/or hydraulic fluid between the bores 122 and 138. The piston 124 is normally maintained in the position illustrated in FIG. 4 by means of a light-weight return spring 144 which keeps the piston 124 in abutment with a shoulder provided by a snap ring 146 seated in the housing 120. In this position, the piston 124 is at the end of the bore 122 adjacent the outlet opening 128. Similarly, the piston 136 is maintained at the end of the bore 138 adjacent the opening 140 by a light-weight return spring 148. It will be seen that the valve element 134 has the elongated cylindrical shape of a stem and is provided with a conical tip 150 adapted to conformably seat against the valve seat 132.

Upon the energization of the solenoid 52, the valve 46 opens to admit compressed air into the bore 138 to act against the piston 136, thereby moving the piston 136 against the bias of the return spring 148 to cause the valve element 134 to close against the valve seat 132. Continued movement of piston 136 causes the valve element 134 to move the piston 124 toward the inlet opening 126, thereby relieving the pressure of fluid in the brake cylinder 42 by enlarging the volume or area within which brake fluid in the brake cylinder 42 is free to flow. It will be seen that the extent of displacement of piston 124 toward the inlet opening 126 is dependent upon the force with which the piston 136 is displaced by compressed air from the relay valve 12. This in turn is dependent upon the operation of the treadle 10 by the operator of the vehicle. In the event of a severe brake application in which the treadle 10 is depressed a great extent, the force acting against the piston 136 will be great and the extent of the displacement of the piston 124 will be increased over that occasioned by a less severe braking stop. The reduced braking effort caused by the reduction in hydraulic pressure in the brake cylinder 42 eliminates the skid and restores the rotation of the wheel 60 to a speed determined by the speed of the vehicle. By this means, the inertia member 58 immediately returns to its normal position relative to the support member 72 under the influence of the spring 114, the shoulder portion 112 of the inertia member 58 moves away from the switch 56 and its normally open contacts are permitted to reopen, thereby deenergizing the solenoid 52. When this occurs, the passage of compressed air from the relay valve 12 through the valve 46 is interrupted and compressed air in the bore 138 is exhausted through an exhaust opening 152 in the valve 46. In this connection, it is to be noted that the exhaust opening 152 is closed by the valve element of the valve 46 when the solenoid 52 is energized. Upon the exhausting of air from the bore 138, the spring 148 becomes effective to return the piston 136 to the right-hand position illustrated in FIG. 4, thereby opening valve seat 132 of the piston 124 and permitting the spring 144 to move the piston 124 to the right-hand position shown in FIG. 4. The bypass opening 130, which is now opened, permits the direct transmission of fluid pressure from the inlet 126 through bypass opening 130 to the outlet 128 for normal braking.

While it will be apparent that the preferred embodiment herein illustrated is well calculated to fulfill the objects above stated, it will be appreciated that the invention is susceptible to modification, variation and change without departing from the proper scope or fair meaning of the subjoined claims.

What is claimed is:

1. A vehicle brake system including a source of fluid pressure, operator controlled means for regulating the pressure delivered from said source of fluid pressure, a brake cylinder arranged for pressurization by said source of fluid pressure, normally deactive means between said source of fluid pressure and said brake cylinder movable in a direction opposing the transmission of fluid pressure from said source of fluid pressure to said brake cylinder, the opposing movement of said last named means being motivated by fluid pressure regulated by said operator controlled means, and means for activating said last named means upon the occurrence of conditions associated with excessive brake application.

2. A vehicle brake system including a source of fluid pressure, operator controlled means for regulating the pressure delivered from said source of fluid pressure, a brake cylinder arranged for pressurization by said source of fluid pressure, normally deactive fluid displacing means between said source of fluid pressure and said brake cylinder movable in a direction opposing transmission of fluid pressure from said source and movable to displace fluid toward said source of fluid pressure, fluid pressure responsive means for actuating said fluid displacing means in said direction, said last named means being directly motivated by fluid pressure regulated by said operator controlled means in effecting the said movement of said fluid displacing means, said last named means being inoperative during rates of deceleration which are normally insufficient to produce skidding of the vehicle.

3. A vehicle brake system including a source of fluid pressure, a brake cylinder, operator controlled means for regulating the pressure delivered from said source of fluid pressure, a brake cylinder arranged for pressurization by said source of fluid pressure, a regulating mechanism interposed between said operator controlled means and said brake cylinder, said regulating mechanism having a housing provided with an inlet opening and an outlet opening, fluid displacing means between said inlet opening and said outlet opening, normally deactive fluid pressure operated means motivated by fluid pressure regulated by said operator controlled means and movable to apply a force to said fluid displacing means in a direction opposing transmission of fluid pressure from said source and relieving fluid pressure at said outlet opening, a normally closed valve through which operating fluid is supplied to said fluid pressure operated means, and means for opening said valve upon the occurrence of predetermined conditions associated with excessive brake application.

4. A vehicle brake system including a source of pneumatic pressure, operator controlled means for controlling the discharge of air from said source of pneumatic pressure, a master cylinder for displacing hydraulic fluid operated by the regulated air discharged from said source of pneumatic pressure, a brake cylinder for braking a wheel of a vehicle arranged for pressurization by hydraulic fluid from said master cylinder, fluid displacing means between said master cylinder and said brake cylinder, normally deactive operating means for said fluid displacing means arranged to move said fluid displacing means in a direction opposing transmission of fluid pressure from said master cylinder to said brake cylinder, said operating means being directly motivated by regulated air from said source of pneumatic pressure, a valve through which air is supplied to said operating means, and means responsive to excessive deceleration of the vehicle brake by said brake cylinder for effecting operation of said valve to deliver air to said operating means.

5. A vehicle brake system including a source of fluid pressure, operator controlled means for regulating the pressure delivered from said source of fluid pressure, a brake cylinder for braking a wheel of the vehicle arranged for pressurization by said source of fluid pressure, a first piston disposed between said source of fluid pressure and said brake cylinder for displacing fluid toward said source of fluid pressure, a normally deactive second piston arranged to apply a force to said first piston in a direction opposing transmission of fluid pressure from said source, said second piston being directly motivated by fluid pressure regulated by said operator controlled means, a valve through which operating fluid is delivered to said second piston, and means responsive to excessive deceleration of the wheel brake by said brake cylinder for effecting operation of said valve.

6. A vehicle brake system including a source of fluid pressure, operator controlled means for regulating the pressure delivered by said source of fluid pressure, a brake cylinder for braking a wheel of a vehicle arranged for pressurization by said source of fluid pressure, a first piston disposed between said source of fluid pressure and said brake cylinder and movable in a direction opposing transmission of fluid pressure from said source, said first piston having a bypass opening therein for the direct transmission of fluid pressure therethrough to said brake cylinder, a normally deactive second piston having means for closing said bypass opening and being operable to produce movement of said first piston, said second piston being directly motivated by fluid regulated by said operator controlled means, a valve normally closing the supply of operating fluid to said second piston, and means for opening said valve upon the occurrence of a predetermined rate of deceleration of the wheel braked by said brake cylinder.

References Cited by the Examiner

UNITED STATES PATENTS

| | | | |
|---|---|---|---|
| 2,107,823 | 2/38 | Hallot | 188—181 |
| 2,726,739 | 12/55 | Jeanson | 188—181 |
| 2,827,137 | 3/58 | Lockheed | 188—181 |
| 2,868,338 | 1/59 | Lucien et al. | 188—181 |

FOREIGN PATENTS 382,241   10/32   Great Britain.

ARTHUR L. LA POINT, *Primary Examiner.*

DUANE A. REGER, *Examiner.*